Nov. 30, 1948.　　　C. W. CHINDLUND　　　2,454,990
IMPLEMENT SEAT SUPPORT
Filed Sept. 30, 1946

Inventor
CECIL W. CHINDLUND.

By Beale and Jones
Attorney

Patented Nov. 30, 1948

2,454,990

UNITED STATES PATENT OFFICE 2,454,990

IMPLEMENT SEAT SUPPORT

Cecil W. Chindlund, Storm Lake, Iowa

Application September 30, 1946, Serial No. 700,207

3 Claims. (Cl. 155—51)

1

My invention is concerned with means for supporting seats on mobile devices which are customarily operated over rough ground such as road scrapers, bulldozers, tractors and other wheeled agricultural implements.

Within the past generation great progress has been made in the devolpment of smooth wide highways and the riding qualities of passenger and commercial automobiles which ride upon such highways. Similar progress has not been made in the riding qualities of wheeled road building and agricultural implements notwithstanding the fact that such vehicles are customarily not employed on smooth highways—on the contrary except when travelling to and from different farms or places of operation, vehicles of the class to which my invention relates are customarily employed over rough, rugged terrain or at best farm lanes and unimproved roads. That there is need to improve the riding qualities of such vehicles is self-evident to anyone who has ever spent a full day in the seat of a tractor while plowing or cultivating freshly plowed fields or while riding over frozen or sun-baked open country.

The existing failure to improve the riding qualities of seats on wheeled equipment of the type under contemplation has not been caused by failure to appreciate the problem of providing seating comfort. It has been caused, however, by the difficulty of providing comfort without sacrificing the safety features and sturdiness required for operation over rough terrain. Agricultural and roadbuilding equipment can be inherently dangerous—both fatal and crippling accidents can happen to the operator if he is thrown under, onto or in the path of such moving equipment. There is real likelihood of an operator's being thrown from his seat when one wheel of the vehicle hits an unseen, unyielding object such as a tree stump or boulder or when one or more of the wheels hit an unseen gully or hole. Even when such ground hazards are seen and the operator has an opportunity to prepare himself in advance there is still, nevertheless, a very considerable shock to the vehicle transmitted to the operator thru the seat on which he rides. To prevent accidents from such shocks and at the same time to provide a seat which may be rapidly vacated by the operator as for instances in emergencies when the vehicle overturns, all-metal seats, partially conforming to the posterior of the operator, attached to one end of a pivoted support are customarily employed. This arrangement permits up and down movement of the

2 seat in a vertical plane, and limits forward or rearward movement of the seat to the arc of a circle of which the pivot point is the center. The movement of the seat is such an arcuate path is of course in a vertical plane. Efforts have been made to limit this movement by the provision of resilient members or springs designed to cushion or restrain the seat. Such efforts have been signally unsuccessful for reasons which will be discussed more fully hereafter.

In the drawings.

Figure 1:
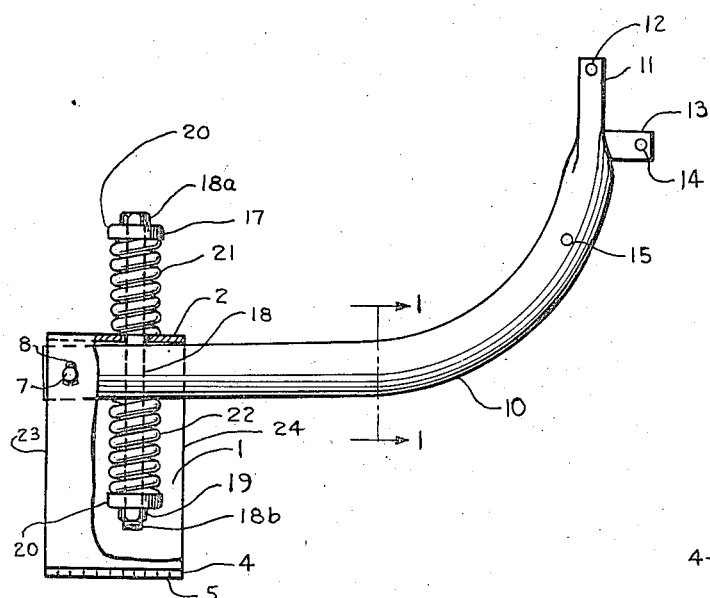
Figure 1 is a side elevation of one form of my invention, partially in cross section, in which the seat supporting end of the seat supporting arm is conventionally shown and in which the seat per se is not part of my invention.
Figure 2:
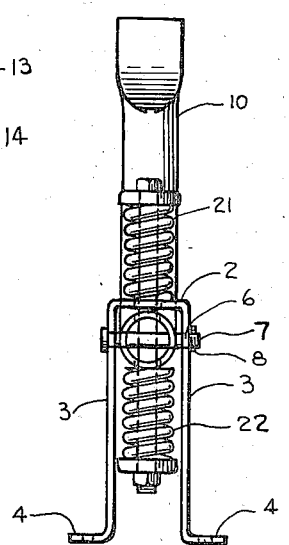
Figure 2 is an end elevation viewed from the pivoted end of the seat supporting arm.
Figure 3:
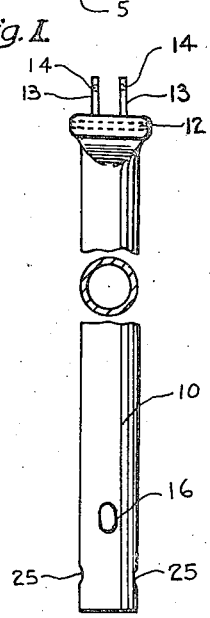
Figure 3 is a top plan view of the seat supporting arm per se, partially broken to show a cross sectional view of the arm at the point I—I of Figure 1.
Figure 4:
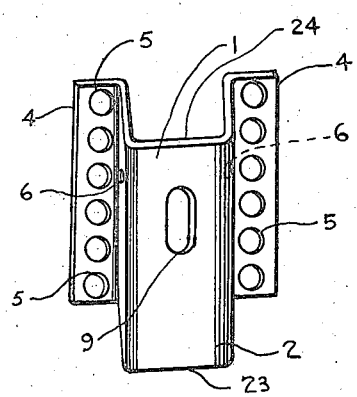
Figure 4 is a plan view, in perspective, of the supporting bracket.

In the foregoing figures of the drawings which illustrate one embodiment of my invention like reference numerals represent the same or similar elements in each of the several figures. I have provided a bracket I which may be adapted to be affixed to any desired part of the frame or chassis of a wheeled implement such as a tractor. The bracket may desirably be cast or otherwise fabricated to provide a relatively flat top surface 2, a pair of vertical side walls, 3, 3 and a pair of outwardly flared, horizontal bottom flanges 4, 4. For the sake of clarity I have designated as 23 one end edge of the bracket I, which has a top 2, side wall 3 and associated flange 4; the opposite end edge of the bracket including the corresponding elements I have designated 24. It will be understood that preferably the bracket I is an integral element desirably a single casting. Each of the said flanges 4, 4 is provided with a plurality of spaced holes 5 to provide bolt holes for adjustably attaching the bracket I to the implement frame, not shown, by means of bolts, not shown. At a suitable point adjacent their upper ends, and also adjacent the bracket edge 23, there are provided thru each of the side walls 3, 3 of the bracket, suitable aligned holes 6, 6, so positioned and proportioned as to accommodate a suitable horizontally disposed pivot pin or bolt 7 which may be readily removable yet held in position by means of a cotter pin 8. On the top surface 2 of the bracket I and at a point approximately equidistant from the side walls 3, 3, yet closer to the edge of 24 than to the edge of 23 of the bracket, I have provided an orifice 9 so proportioned as to accommodate a suitable vertically disposed bolt or rod 18 and being large enough to permit appreciable lateral displacement as well as vertical movement of said bolt or rod 18 without excessive frictional engagement between the said bolt 18 and the walls of said orifice 9, all as will hereafter be more fully explained.

I also provide a seat supporting arm or bar 10, shown in its preferred embodiment as being tubular. Toward the outer or seat supporting end of this arm I may provide extensions 13, 13 suitably pierced by aligned holes 14, 14 while the extremity of this end of the arm 10 may desirably be flattened as at 11 and pierced with one or more bolt holes 12. The foregoing elements on the outer or seat supporting end of the arm 10 are conventional means for attaching a metal implement seat to the end of the arm 10 as for example the seat shown on a similar tubular arm in U. S. patent 2,298,450 of David B. Baker. The seat may be of any desired construction and it may be attached to the outer end of arm 10 in any desired manner without departing from the spirit of my invention. Thus the arm 10 may be pierced by one or more additional bolt holes 15 for bolting additional brace members for the seat (not shown) to the arm 10. It is apparent that lugs 13 may be used to be connected to additional braces for the seat.

At the opposite or pivot end of the arm 10 I provide a pair of aligned holes 25, 25 so positioned and proportioned as to accommodate the pivot pin or bolt 7 when holes 25, 25 are placed in alignment with the corresponding holes 6, 6 in the bracket side walls 3, 3. Adjacent the pivot holes 25, 25, but at right angles thereto I provide an additional pair of aligned orifices 16, 16 pierced through arm 10 and so positioned and proportioned as to be in substantial alignment with orifice 9 of the bracket 1, and, similar to said orifice 9, being adapted to accommodate a suitable vertically disposed bolt or rod 18 and being large enough to permit appreciable lateral displacement as well as vertical movement of said bolt or rod 18 without excessive frictional engagement between the said bolt 18 and the walls of said orifices 16, 16, all as will hereafter be more fully explained.

Vertically disposed to pass thru the said orifices 9 and 16, 16 when aligned, I provide a bolt or rod 18, shown as having its upper end formed into a conventional integral bolt head 18a and its lower end suitably threaded as at 18b for engagement with a conventional nut 19 but which may also be formed with both ends so threaded for engagement with conventional, plural, or specially designed locknuts. Adjacent each end of the bolt 18, I provide a suitable collar 20, 20 of a size and shape adapted to confine and furnish a bearing surface for one end of a helical compression spring. Surrounding the upper portion of the rod or bolt 18 and disposed between the upper collar 20 and the top 2 of the bracket 1 I provide a suitable helical compression spring 21. Also surrounding the rod or bolt 18 and disposed between the lower collar 20 and the lower surface of the supporting arm 10, I provide a suitable helical compression spring 22.

With reference to the foregoing detailed description of the embodiment illustrated in the drawings it will be seen that I have provided a pivotally suspended supporting arm for a seat for vehicles of the type previously discussed; further that I have provided springs for limiting and absorbing the shock caused by movement of the supporting arm under the influences of the forces resulting from the weight of the operator, movements of the vehicle over uneven surfaces, and the gravitational force and inertia of the several bodies concerned. I am aware that efforts have been made, as in United States Patents 1,864,232 and 2,298,450 to utilize a spring to limit and absorb such shocks on tractor seats. All prior art devices of which I am aware suffer from previously unsurmounted disadvantages. The resilient support used by the prior art have been either too resilient or too stiff. If too resilient, as when sensitive springs are employed, the seat (and the operator seated thereon) moves up and down so readily under the influence of every minor deviation of the terrain that the resilient spring is soon fatigued and breaks. Moreover, the operator is constantly subjected to a continuous pendulum-like vibration in a substantially vertical plane. On the other hand, if the resilient element is made strong enough to withstand fatigue it results in two serious defects in operation. The non-sensitivity of the spring makes it non-responsive to minor deviations in the surface of the terrain so the shock of such minor deviations, including as well the shock of wheel lugs or raised tread on road surfaces are transmitted to the seat and thence to the driver as undiminished as tho no resilient support existed. At the opposite extremity of operating conditions a strong, stiff spring stores up enough energy when subjected to sudden strong shocks, as when the vehicle hits a boulder or gully, to throw the operator clear of the seat or at best result in violent vertical vibrations of the seat. The possible danger to its operator from such violent movement or catapulting is self-evident. The possibility of breakage or early fatigue of the spring is also very real, so real that prior are manufacturers of such supports customarily provides lugs or stops to support the supporting arm when the spring breaks.

My construction eliminates the disadvantages of the unsatisfactory over-sensitive or over-stiff spring suspensions of the prior art. As the vehicle to which my seat support is attached is placed in operation, the weight of the operator on the seat depresses the arm 10. The downward movement of arm 10 forces the arm against the upper end of helical compression spring 22 and tends to compress the coils of said spring against each other. Minor vibrations in the vehicle transmitted to the vehicle frame will cause minor up and down movement of the seat which, in the downward direction will be yieldingly resisted by the springs 21 and 22 and in the upward direction will be opposed to the normal gravitational force of the earth's surface. Under more severe vibrations or shock increased downward movement of the seat and arm 10 will tend further to compress spring 22 until it approaches complete compression, i. e. a state wherein all coils of the spring are fully closed. As this state is approached the lower end of spring 22 bearing on collar lower 20 forces the bolt or rod 18 downwardly and compresses the upper spring 21. Further downward movement of arm 10, whether or not the coils of spring 22 are completely closed, increases the downward movement of rod or bolt 18 and further compresses spring 21. In general the coils of spring 22 will not be completely closed before spring 21 is initially compressed. Therefore at no point in its downward movement will arm 10 meet a completely compressed unyielding lower spring 22 with the resultant shock which results when the limit of a spring's compressibility has been reached. The spring 21 cushions downward movement of the arm 10 even when such movement is great due to severe shocks.

Now with reference to reverse movement of arm 10. Under the influence of minor shocks which have caused arm 10 to move downward only to a point where spring 22 is partially compressed, ensuing upward movement is naturally somewhat slowed by the action of normal gravitational forces. Nevertheless, some upward movement of arm 10 will result. This will be attended by slight and gradual expansion of the previously partially compressed spring 22. Insufficient energy will have been stored in spring 22 during its partial compression to give any sudden lift or catapulting effect to arm 10 and the vehicle seat. Where, however, a severe shock and large depression of arm 10 has completely compressed spring 22 there is still no sudden lift or catapulting effect when the downward force on arm 10 is spent and arm 10 starts to move upward. This is because both springs 21 and 22 tend to expand simultaneously. Expansion of spring 21 may be accomplished only thru upward movement of upper collar 20 and the bolt 18. Upward movement of bolt 18 tends to compress lower spring 22 between lower collar 20 and the under surface of arm 10. Thus too rapid expansion of upper spring 21 is resisted by the compressive forces operating on spring 22.

During the downward movement of arm 10 the two springs supplement each other in providing resistance to such movement. During upward movement of arm 10 the expansive forces of the two springs are initially opposed and remain opposed until bolt 18 has been elevated to its normal upper position. No sudden snap-back to normal expanded length is possible for either spring, consequently, catapulting of the seat is impossible.

It will be apparent that springs 21 and 22 may be made of identical or of different strengths. If of identical strengths, there will be a tendency for both springs to be initially compressed to a more equal degree when arm 10 is depressed. If, however, the springs are made of unequal strengths, the more sensitive spring will be initially compressed, whether it is in the upper or lower position and the stronger spring will be latterly compressed. The orifices thru bracket 1 and arm 10, thru which bolt 18 is passed are purposely made sufficiently large to permit 18 to move up and down freely without any frictional engagement or binding with the walls of the orifices. At the same time the orifices should be small enough to provide ample bearing surfaces around their margins for the adjacent spring ends.

It will be seen that I have provided a support for an implement seat which is resiliently supported by means which permit yet resist even extreme downward movements of the supporting arm but prevent the rapid snapbacks or "catapulting" upward movements of the prior art supporting arms.

It will be understood that while I have described my seat support with particular reference to wheeled road building and agricultural implements, my seat support is equally well adapted to special vehicles such as ordinance and to tractors and vehicles equipped with caterpillar tread. To embrace all such vehicles while excluding conventional passenger automobiles and trucks primarily adapted for use on improved highways I employ the term "cross-country vehicles" in this specification and appended claims.

While I have shown and described a preferred embodiment of my invention I do not wish to confine myself to the example given, that example being used only to illustrate my invention. The scope of the invention is to be limited only by the prior art and the appended claims.

What I claim is:

1. In a seat support for cross-country vehicles a bracket adapted to be secured to the vehicle frame, a seat supporting arm, one end of which is adapted to support a seat and the other end of which is pivotally connected to the said bracket and resilient means disposed intermediate the said two ends of the supporting arm for yieldingly supporting said arm, said resilient means comprising a bolt passed vertically thru aligned holes in said bracket and said arm, spring-restraining means at each end of said bolt, a spring confined between the upper end of said bolt and the top of said bracket and a second spring confined between the lower end of said bolt and the bottom of said arm.

2. In a seat support for cross-country vehicles a bracket adapted to be secured to the vehicle frame, a seat supporting arm, one end of which is adapted to support a seat and the other end of which is pivotally connected to the said bracket and resilient means disposed intermediate the said two ends of the supporting arm for yieldingly supporting said arm, said resilient means comprising in combination a bolt passed loosely and vertically thru aligned holes in the top of said bracket and in the top and bottom of said arm, a collar at the upper end of said bolt, a compression spring confined between said collar and the top surface of said bracket, a second collar at the lower end of said bolt, and a second compression spring confined between said second collar and the bottom of said arm.

3. In a seat support for cross-country vehicles a bracket adapted to be secured to the vehicle frame, a seat supporting arm, one end of which is adapted to support a seat and the other end of which is pivotally connected to the said bracket and resilient means disposed intermediate the said two ends of the supporting arm for yieldingly supporting said arm, said resilient means comprising in combination a bolt passed loosely and vertically thru aligned holes in the top of said bracket and in the top and bottom of said arm, a collar at the upper end of said bolt, a helical compression spring encircling said bolt and confined between said collar and the top surface of said bracket, a second collar at the lower end of said bolt, and a second helical compression spring encircling said bolt and confined between said second collar and the bottom of said arm.

CECIL W. CHINDLUND.

REFERENCES CITED

The following references are of record in the file of this patent:

UNITED STATES PATENTS

| Number | Name | Date |
|---|---|---|
| 20,863 | Carrier | July 13, 1858 |
| 1,678,668 | Collier | July 31, 1928 |
| 1,864,282 | Sperry | June 21, 1932 |
| 2,298,450 | Baker | Oct. 13, 1942 |